United States Patent
Scofield et al.

(10) Patent No.: US 9,755,885 B1
(45) Date of Patent: Sep. 5, 2017

(54) LOCAL RENDERING IN LIEU OF STREAMING

(71) Applicant: Amazon Technologies, Inc., Reno, NV (US)

(72) Inventors: Christopher L. Scofield, Seattle, WA (US); Luan Khai Nguyen, Auburn, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 170 days.

(21) Appl. No.: 13/919,313

(22) Filed: Jun. 17, 2013

Related U.S. Application Data (62) Division of application No. 12/424,730, filed on Apr. 16, 2009, now Pat. No. 8,468,070.

(51) Int. Cl.
*H04L 29/06* (2006.01)

(52) U.S. Cl.
CPC .............................. *H04L 29/06476* (2013.01)

(58) Field of Classification Search
CPC .............. G06Q 30/04; G06F 17/30053; G06F 17/30058; G06F 21/10; G06F 3/0482
USPC .......................... 705/34, 26, 26.35; 370/328; 707/999.001; 726/30; 715/783; 713/193
See application file for complete search history.

(56) References Cited

U.S. PATENT DOCUMENTS

| | | | | |
|---|---|---|---|---|
| 7,069,271 B1 * | 6/2006 | Fadel | ..................... | G06Q 10/00 705/26.62 |
| 7,761,591 B2 * | 7/2010 | Graham | ................. | G06Q 40/02 709/204 |
| 8,055,910 B2 * | 11/2011 | Kocher et al. | ................ | 713/193 |
| 8,468,070 B1 | 6/2013 | Scofield et al. | | |
| 2002/0069246 A1 | 6/2002 | Gideon | | |
| 2002/0120721 A1 | 8/2002 | Eilers et al. | | |
| 2004/0160911 A1 * | 8/2004 | Zilliacus | ................. | G06F 21/10 370/328 |
| 2006/0100924 A1 * | 5/2006 | Tevanian, Jr. | ......... | G06Q 30/02 705/14.23 |
| 2006/0242106 A1 * | 10/2006 | Bank | ................ | G06F 17/30038 |
| 2006/0259852 A1 * | 11/2006 | Upendran | ......... | G06F 17/30873 715/234 |
| 2007/0106551 A1 * | 5/2007 | McGucken | ..................... | 705/10 |
| 2008/0052742 A1 * | 2/2008 | Kopf et al. | ..................... | 725/34 |
| 2008/0133759 A1 | 6/2008 | Weel | | |
| 2008/0195970 A1 * | 8/2008 | Rechsteiner | ...... | G06F 17/30056 715/810 |
| 2008/0228925 A1 | 9/2008 | Armstrong et al. | | |

(Continued)

*Primary Examiner* — Vanel Frenel (74) *Attorney, Agent, or Firm* — Thomas | Horstemeyer, LLP (57) ABSTRACT

Disclosed are various embodiments including systems and methods relating to the rendering of media content items on clients. For example, a media content item is designated in a server to be rendered on a client, where the server is configured to stream the media content item to the client. It is determined whether a copy of the media content item is locally accessible to the client for rendering on the client. When the copy of the media content item is not locally accessible to the client, the media content item is streamed from the server to the client. The server may obtain from the client a license to share the media content item for streaming to a predefined number of other clients when the copy of the media content item is locally accessible to the client and the client has the license.

20 Claims, 4 Drawing Sheets

(56) References Cited

U.S. PATENT DOCUMENTS

| | | |
|---|---|---|
| 2009/0157842 A1 | 6/2009 | Shaffer et al. |
| 2009/0164514 A1* | 6/2009 | Svendsen et al. ......... 707/104.1 |
| 2009/0248785 A1* | 10/2009 | Gemelos et al. ............. 709/201 |
| 2010/0125511 A1* | 5/2010 | Jouret et al. .................... 705/27 |
| 2010/0131844 A1* | 5/2010 | Wohlert ........................ 715/716 |
| 2010/0185673 A1* | 7/2010 | Toebes .................... G06F 21/10 707/780 |
| 2010/0223392 A1* | 9/2010 | Pond et al. ................... 709/231 |
| 2011/0231273 A1* | 9/2011 | Buchheit ...................... 705/26.1 |
| 2012/0151015 A1* | 6/2012 | Plastina et al. ............... 709/219 |

\* cited by examiner

LOCAL RENDERING IN LIEU OF STREAMING

CROSS-REFERENCE TO RELATED APPLICATIONS

This application is a divisional of, and claims priority to, co-pending U.S. Patent Application entitled "LOCAL RENDERING IN LIEU OF STREAMING," filed on Apr. 16, 2009, and assigned application Ser. No. 12/424,730, which is incorporated herein by reference in its entirety.

BACKGROUND

The dawn of the Internet has seen the creation of Internet radio. More and more, various sites stream media content items such as audio media, video media, or audio/video media to client devices of users over the Internet. Each time a media content item is streamed by a website to a client device, the website entity pays a royalty fee to the media studio for the use of the media content item. Unfortunately, it can be the case that a given media content item is streamed to a client device and a corresponding royalty paid even though the media content item is already stored in the client device having been previously purchased by the user.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
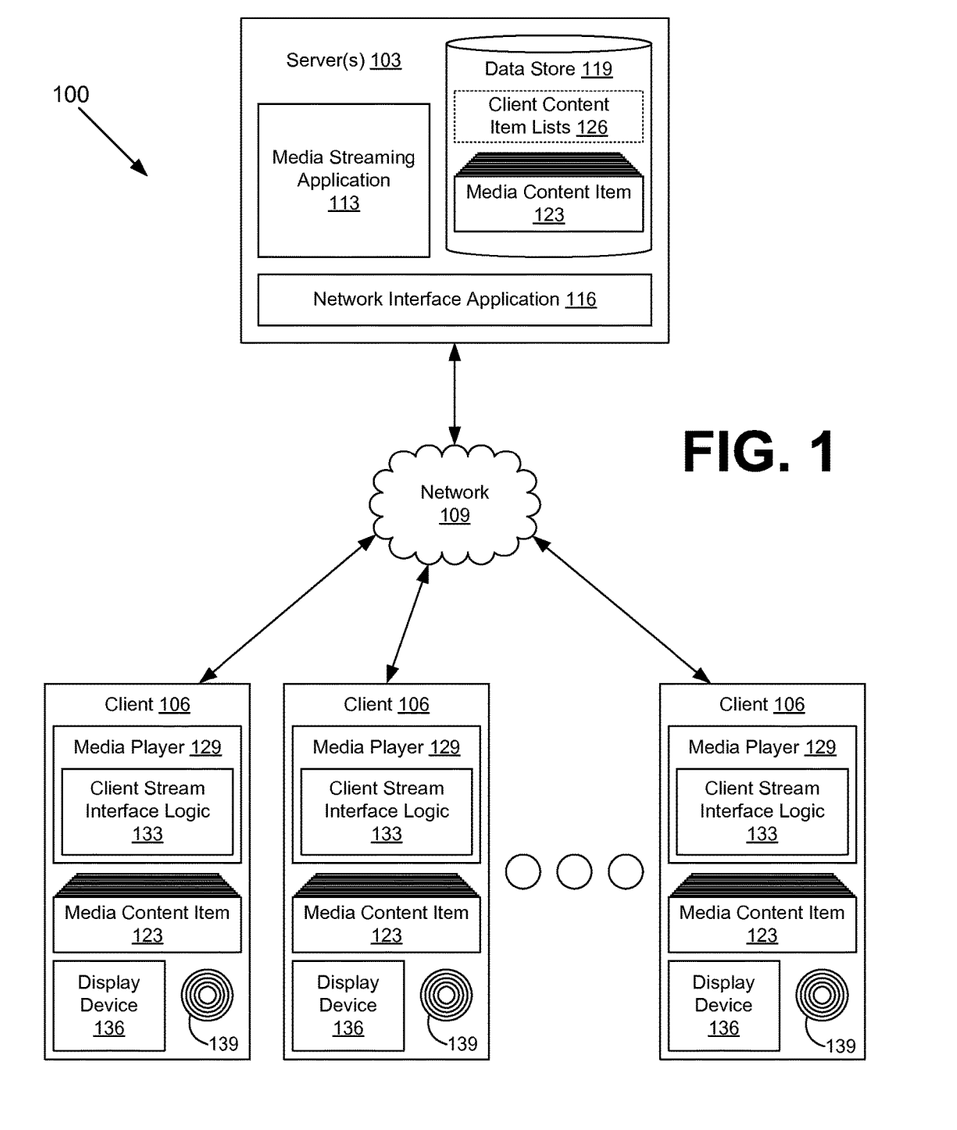
FIG. 1 is a drawing of one example of a media content transmission network according to an embodiment of the present disclosure.

With reference to FIG. 1, shown is a media content transmission network 100 according to an embodiment of the present disclosure. The media content transmission network 100 includes a server 103 and a plurality of clients 106.

The server 103 and each of the clients 106 are coupled to a network 109. The network 109 may comprise, for example, the Internet, intranets, extranets, wide area networks (WANs), local area networks (LANs), wired networks, wireless networks, or other suitable networks, etc., or any combination of two or more such networks.

The server 103 may comprise, for example, a server computer or like system. The server 103 may represent multiple servers arranged, for example, in one or more server banks or other arrangements. Such servers may be located in a single installation or may be dispersed among many different geographical locations. For purposes of convenience, the server 103 is referred to herein in the singular. However, in one embodiment, the server 103 represents a plurality of servers arranged as described above.

The server 103 is configured to execute various applications such as, for example, a media streaming application 113, a network interface application 116, and other applications. In addition, accessible to the server 103 is a data store 119. Various data is stored in the data store 119 such as, for example, media content items 123, client content item lists 126, and other data. The media streaming application 113 is executed to stream media content items 123 to clients 106 and to perform other functions as will be described. The media content items 123 may comprise, for example, audio content (i.e. music, etc.), video content, audio/video content (i.e. movies, videos, etc.), or other content.

Each of the clients 106 may comprise, for example, a processor-based system such as computer system. Such a computer system may be embodied in the form of a desktop computer, a laptop computer, a personal digital assistant, a cellular telephone, or other devices with like capability.

Executed on each of the clients 106 is a media player 129 or other application(s). The media player 129 may be executed in the client 106 as a portion of a browser application or other appropriate application. The media player 129 includes client stream interface logic 133. In addition to being stored in the data store 119, one or more media content items 123 may be locally accessible to the client 106. A media content item 123 is "locally accessible" to a client 106, for example, when it is stored in a memory or other location that is accessible to the client 106 so that the media content item 123 may be rendered by the client 106. Such a memory may be included within the client 106, or may reside in a device with which the client 106 may communicate such as on a local server in a local area network, etc.

The media player 129 is configured to render the media content items 123. One or more of the media content items 123 that are stored in, or that are otherwise locally accessible to, the client 106 may be the same as one or more of the media content items 123 stored in the data store 119 of the server 103. The client stream interface logic 133 is configured to communicate with the media streaming application 113 through the network interface application 116 to determine whether the media content items 123 locally accessible to the client 106 are to be rendered on the client 106 as will be described in further detail.

In addition, associated with each of the clients 106 are various output devices such as, for example, a display device 136, a speaker 139, and/or other output devices. Each of the clients 106 may further comprise various input devices such as pushbuttons, interactive screens, microphones, and other input devices.

The network interface application 116 is executed to facilitate communication with the clients 106. The network interface application 116 may comprise, for example, a web server application or other type of application as can be appreciated. Where the network interface application 116 comprises a web server application, for example, the server 103 may communicate with the clients 106 using hypertext transfer protocol (HTTP), secure HTTP, and/or simple object access protocol (SOAP) with one or more media players 129, web browser applications, or other applications, for example, executed on the clients 106. Such communication at the application layer may, for example, be expressed in extensible markup language (XML). Alternatively, other applications beyond browser applications and other protocols beyond the above protocols may be employed.

Next, a discussion of the operation of the components in the media content transmission network 100 is provided. To begin, the media streaming application 113 is configured to transmit via streaming or other transmission approach the media content items 123 stored in the data store 119 to the clients 106 as per the request by the clients 106. To this end, the media streaming application 113 may be employed, for example, by an online radio station, a media broadcaster, or other entity that continually streams media content items 123 to clients 106 over time. Alternatively, the media streaming application 113 may be operated by some other entity that is delivering the media content items 123 in the data store 119 to clients 106 in some other manner. As contemplated herein, the term "streaming" refers to the transmission of a media content item 123 from the server 103 to a client 106 to be rendered on the client 106. In one embodiment, the respective media content item 123 streamed is not ultimately stored in the client 106 for future use. For example, the media content item 123, or portions thereof, may be deleted from the client 106 just after such content is rendered, or relatively soon thereafter.

When media content items 123 are streamed to clients 106 in accordance with the operation of the media streaming application 113 by a respective entity, it is often the case that the entity that streams the media content item 123 to the client 106 is required to pay a royalty fee. For example, it may be the case that a royalty fee is paid each time a given media content item 123 is streamed to a respective client 106. Unfortunately, in many cases a media content item 123 may be streamed to a respective client 106 even though the same media content item 123 may already be locally accessible to the client 106. In such cases, streaming the media content item 123 to the respective client 106 is superfluous in that the client 106 already has access to the respective media content item 123. In this sense, the client 106 already holds a right to render the media content item 123 without the need to stream the media content item 123 to the client 106.

According to various embodiments, the media streaming application 113 is configured to determine whether a given media content item 123 is locally accessible to a client 106 for rendering on the client 106 before the media content item 123 is streamed to the client 106. To this end, the media streaming application 113 may designate one or more media content items 123 that are to be rendered on the client 106. The media streaming application 113 may designate such media content items 123 to be rendered on a multitude of the clients 106 when broadcasting content to multiple users over the Internet or other medium as can be appreciated. To this end, the media streaming application 113 includes functionality to stream the media content items 123 to the clients 106. According to one embodiment, the determination is made as to whether one or more media content items 123 are locally accessible to one or more clients 106 before the media content item 123 is actually streamed to a respective client 106.

If it is determined that a respective media content item 123 is not locally accessible to a client 106, then the media streaming application 113 proceeds to stream the media content item 123 from the server 103 to the respective client 106. If it is determined that the media content item 123 to be transmitted to a client 106 is included among the media content items 123 that are locally accessible to a given client 106, then the media streaming application 113 sends a directive from the server 103 to the client 106 directing the client 106 to render the media content item 123 that is locally accessible to the client 106. By rendering the media content item 123 that is locally accessible on the client 106, it is not necessary for the media streaming application 113 to stream the same to the client 106. As a consequence, the payment of a royalty fee for the streaming of the media content item 123 need not be paid, even though the respective media content item 123 is still rendered by the media player 129 on the client 106.

Each time that a media content item 123 is streamed to a client 106, the media streaming application 113 is configured to record a corresponding log in the data store 119 that memorializes the streaming of the media content item 123 to the respective client 106. Similarly, each time a directive is generated by the media streaming application 113 and is sent from the server 103 to a respective client 106 directing the client 106 to render the locally accessible copy of a media content item 123, a log is recorded in the data store 119 that memorializes the sending of the directive. By virtue of the fact that the respective logs are recorded in the data store 119, the information is thus available to determine royalty fees that are to be paid to a copyright holder for the streaming of media content items 123 to clients 106.

According to various embodiments, there are different approaches to be employed in determining whether a given media content item 123 designated to be rendered on the client 106 is already locally available to the client 106. In one embodiment, the media streaming application 113 communicates with the client stream interface logic 133 that is implemented as a portion of the media player 129 or other application to determine whether one or more media content items 123 are locally accessible to the client 106 for rendering on the client 106. In one embodiment, the media streaming application 113 generates a message that is sent from the server 103 to the respective client 106 requesting whether one or more media content items 123 is/are locally accessible to the client 106 for rendering on a client 106. In response, the client stream interface logic 133 examines the media content items 123 to determine if the respective media content item 123 already exists in association with the client 106. The message sent may also include a directive that that client 106 is to render the locally accessible copy(ies) of the media content item(s) 123 if locally available.

Assuming the one or more media content items 123 are locally available, then the client stream interface logic 133 generates a reply to the request from the media streaming application 113 that is sent back to the media streaming application 113 informing the media streaming application 113 as to whether the respective media content item(s) 123 is/are locally accessible to the client 106. Assuming that the media content item(s) 123 is/are locally available to the client 106, then the media streaming application 113 takes no action to send the media content item(s) 123 to the client 106. Otherwise, the media streaming application 113 proceeds to stream the media content item(s) 123 to the respective client 106 to be rendered by the media player 129 at times deemed appropriate. To this end, the actual times that such media content items 123 are streamed to the client 106 may depend upon a broadcasting schedule or other schedule as can be appreciated.

In rendering the media content items 123, the media players 129 may render such media content items 123 using the display device 136 and/or one or more speakers 139 as can be appreciated.

In another alternative, the media streaming application 113 maintains client content item lists 126 within the data store 119. Each of the client content item lists 126 comprises a list of media content items 123 existing on a given client 106. To this end, the media streaming application 113 may be configured to interact with an appropriate synchronization application implemented in the clients 106 to maintain an up-to-date listing of media content items 123 that are locally accessible for respective clients 106. Such synchronization functions are similar to those employed in order to synchronize databases, etc.

By maintaining the synchronization as such, the media streaming application 113 maintains a list of the media content items 123 existing on each respective client 106. Given that the client content item lists 126 are stored in the data store 119, then the media streaming application 113 may determine whether a given media content item 123 is locally accessible to a client 106 for rendering on the client 106 by consulting a respective one of the client content item lists 126. If a given client content item list 126 indicates that a media content item 123 is locally accessible to a client 106, then the media streaming application 113 sends the directive to the given client 106 to render the respective media content item 123 that is locally accessible to the client 106. Otherwise, the media streaming application 113 proceeds to stream or otherwise transmit the media content item 123 to the client 106.

Thus, the determination as to whether a given media content item 123 exists in a client 106 may be made by the media streaming application 113 by communicating with the client stream interface logic 133 or by consulting the client content item list 126 if stored in the data store 119.

In some cases, the media content items 123 are streamed to clients 106 to be rendered in a sequence as may be the case, for example, where the media streaming application 113 is employed by an audio broadcasting station over the Internet or other type of entity. In such case, the determination of whether a media content item 123 is locally available is made and, if possible, a directive is sent to the client 106 to facilitate the rendering of the locally accessible copy of a media content item 123 in coordination with the rendering of prior media content items 123 for seamless rendering without undue delay or interruption. To this end, in one embodiment a directive is sent from the server 103 to initiate the rendering of the media content item 123 on the client 106 at a time that depends upon, or takes into account, a transmission latency between the server 103 and the client 106. For example, the directive may be sent at a time such that the client 106 will receive the directive and be able to implement the rendering of a locally accessible media content item 123 at a predefined time after the completion of the rendering of a prior media content item 123 streamed from the server 103. This ensures that there are no long pauses occurring between the rendering of any two media content items 123 on a given client 106.

In addition, it may be the case that a given client 106 may include a license to render a given media content item 123 on multiple clients 106. To this end, the license may provide for the sharing of a media content item 123 with a limited number of other clients 106. For example, it may typically be the case that a given media content item 123 may be shared with a limited number of other clients 106 such as 3-5 other clients 106 or other number as can be appreciated. If a given client 106 has a license to share a media content item 123 for rendering on a predefined number of other clients 106, then the client stream interface logic 133 may be configured to inform the media streaming application 113 of the existence of such a sharing license.

To this end, such information may be provided to the media streaming application 113 in response to an initial request to determine whether a given media content item 123 is locally accessible to a client 106. Also, the same information may be communicated to the server 103 and stored in a respective client content item list 126 in association with the respective media content items 123 as described above. Assuming that a sharing license exists with respect to a given media content item 123, then it may be the case that the media streaming application 113 can stream or otherwise transmit a media content item 123 to other clients 106 who can render the media content item 123 under the authorization provided by the sharing license. For example, if a sharing license from one client 106 permits the rendering of a media content item 123 on three other clients 106, then it may be the case that the royalty fees for the streaming of the same media content item 123 to three other clients 106 may be negated by the sharing license.

Thus, when the media streaming application 113 discovers that a given client 106 possesses a sharing license for a given media content item 123 that allows the same to be rendered on multiple clients 106 without payment of royalty fees, the media streaming application 113 may be configured to take advantage of the sharing license. To this end, the existence of a sharing license may be employed to reduce royalty fees payable for the streaming or other transmission of media content items 123 based upon the sharing licenses associated with a media content item 123 existing with respect to other clients 106.

Figures 2, 3:
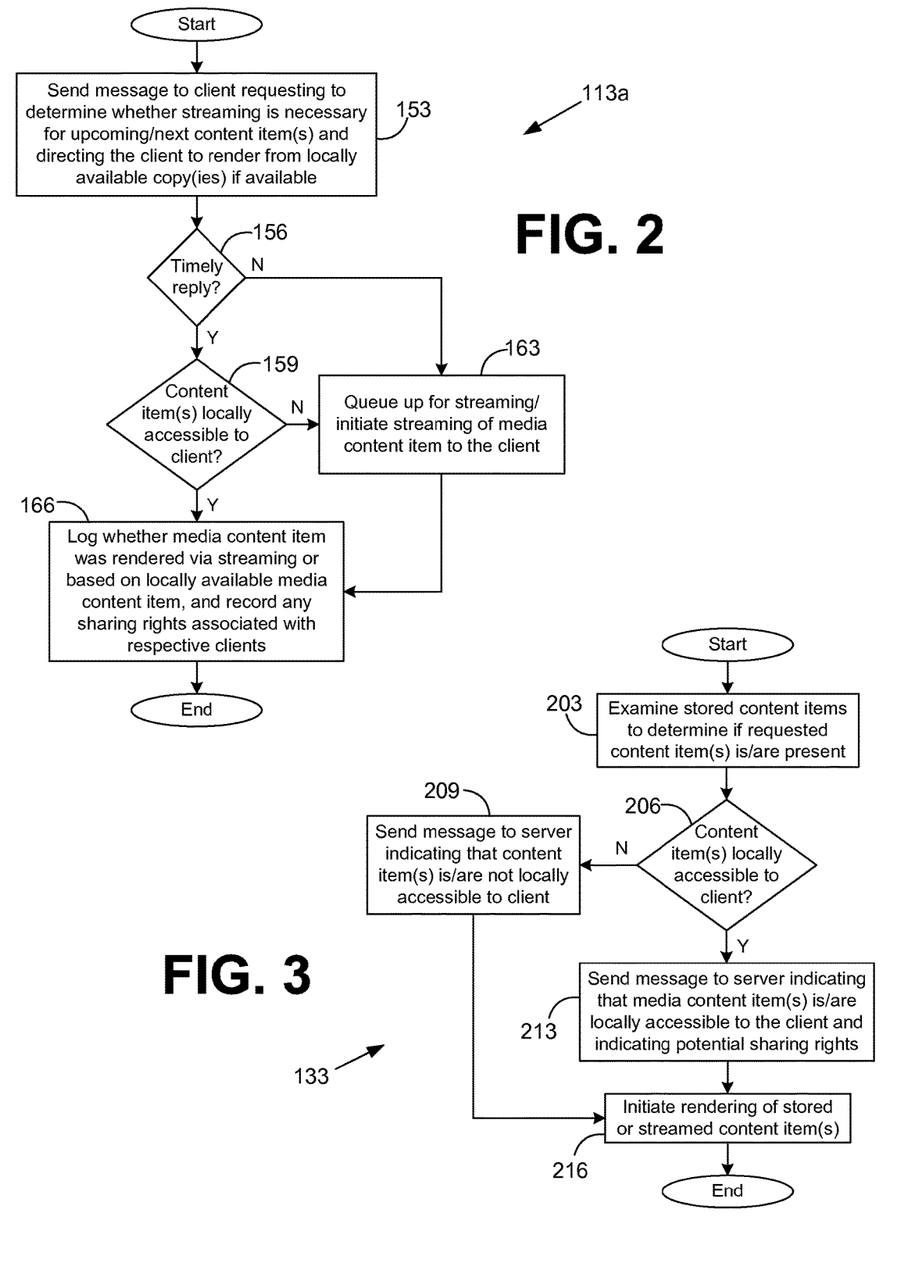
FIG. 2 is a flowchart that depicts one example of at least a portion of the functionality of a media streaming application executable in a server in the media content transmission network of FIG. 1 according to an embodiment of the present disclosure.
FIG. 3 is a flowchart that depicts one example of client stream interface logic executable in a client in the media content transmission network of FIG. 1 according to an embodiment of the present disclosure.

Referring next to FIG. 2, shown is a flowchart that provides one example of the operation of a portion of the media streaming application 113, denoted herein as media streaming application 113*a*, according to an embodiment of the present disclosure. Alternatively, the flowchart of FIG. 2 may be viewed as depicting steps of an example of a method implemented in the server 103 to determine whether a media content item 123 is to be streamed to a client 106 for rendering.

Beginning with box 153, the media streaming application 113*a* sends a message to a client 106 (FIG. 1) directing the client 106 to render an upcoming or next media content item 123 from the media content items 123 that are locally available for the client 106 if, in fact, the media content item 123 is available. To this end, the message may identify a single media content item 123 or multiple media content items 123 that are slated to be streamed to the client 106, for example, in the near future.

In box 156, the media streaming application 113*a* waits to receive a reply from the client 106 to indicate whether one or more of the media content items 123 identified in the request are locally accessible to the client 106. To this end, if such media content items 123 are locally accessible, then the directive embodied in the message of box 153 to render such media content items 123 in place of streaming such media content items 123 to the client 106 is executed on the client 106. In box 156, assuming that a timely reply is received, then the media streaming application 113*a* proceeds to box 159. Otherwise, the media streaming application 113a progresses to box 163.

In box 159, the media streaming application 113a determines whether the one or more media content items 123 are locally accessible to the client 106 based upon the information in the reply. If so, then the media streaming application 113a proceeds to box 166. Otherwise, the media streaming application 113a moves to box 163 as shown.

In box 163, the media streaming application 113a queues up or otherwise initiates the streaming of any media content items 123 to the respective client 106 that are not locally accessible to the client 106. Once such action is queued up or initiated in box 163, then the media streaming application 113a proceeds to box 166.

In box 166, the media streaming application 113a logs whether a given media content item 123 was rendered via streaming to a client 106, or whether such media content item 123 was rendered based on a locally accessible copy of the media content item 123. Further, any sharing rights associated with the client 106 for the respective media content item 123 may be recorded for use in negating royalties associated with the transmission of such media content item 123 to other clients 106. Thereafter, the media streaming application 113a ends as shown.

Referring next to FIG. 3, shown is a flowchart that provides one example of the operation of a portion of the client stream interface logic 133 according to an embodiment of the present disclosure. Alternatively, the flowchart of FIG. 3 may be viewed as depicting steps of an example of a method implemented in a client 106 (FIG. 1) to interact with the media streaming application 113a (FIG. 2) to in determining whether a media content item 123 (FIG. 1) is to be streamed to a client 106 for rendering.

Beginning with box 203, the client stream interface logic 133 examines the locally available media content items 123 to determine if a requested media content item 123 in a message received from the media streaming application 113a is locally accessible to the client 106. If, in box 206, the media content item 123 is not locally accessible, then the client stream interface logic 133 proceeds to box 209. Otherwise, the client stream interface logic 133 proceeds to box 213. In box 209, a message is generated and sent to the server 103 indicating that the respective media content items 123 are not locally accessible to the client 106. Thereafter, the client stream interface logic 133 proceeds to box 216 to initiate the rendering of the locally accessible media content item 123 or the rendering of the streamed media content item 123 from the server 103 as was determined in box 206.

Assuming that the media content item(s) 123 is/are locally accessible to the client 106, then in box 213 a message is sent from the client stream interface logic 133 to the server 103 (FIG. 1) indicating that the respective media content item(s) 123 is/are locally accessible to the client 106. Also, such message may indicate any potential sharing rights associated with such media content items 123. Thereafter, the client stream interface logic 133 then proceeds to box 216 to initiate the rendering of the media content item(s) 123 as described above.

Figure 4:
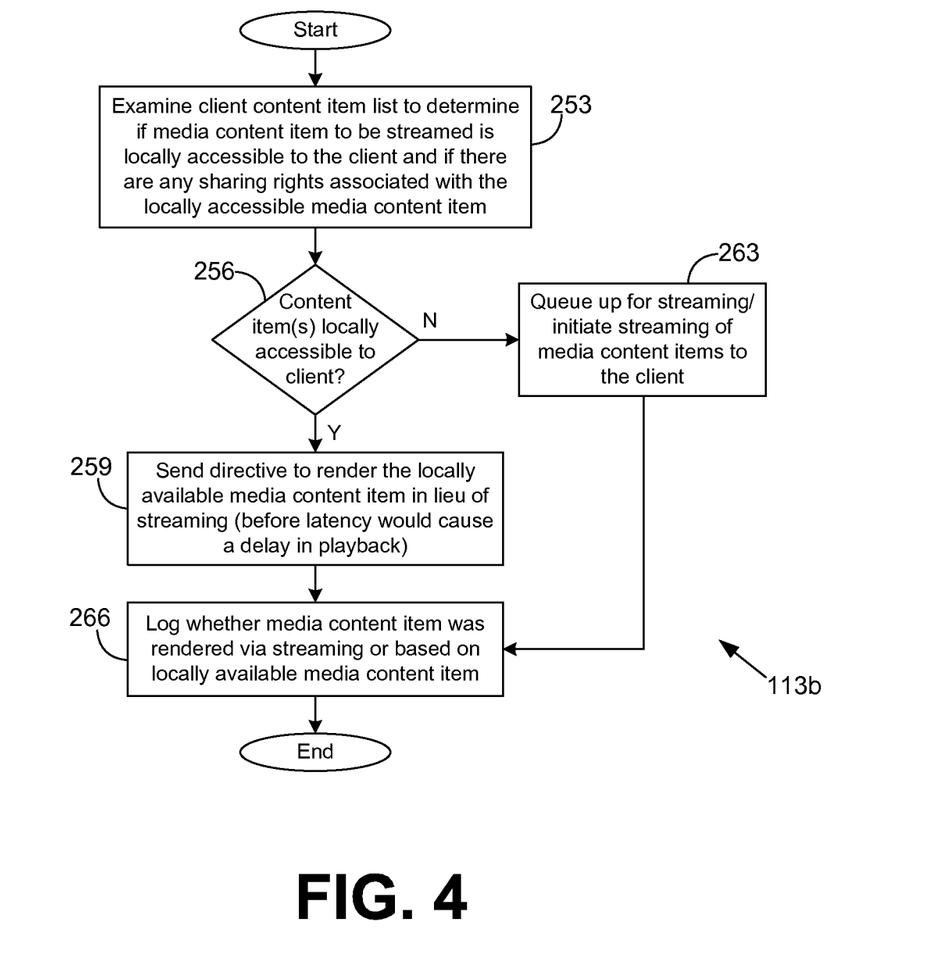
FIG. 4 is a flowchart that depicts an alternative example of at least a portion of the functionality of a media streaming application executable in a server in the media content transmission network of FIG. 1 according to an embodiment of the present disclosure.

Referring next to FIG. 4, shown is a flowchart that provides another example of the operation of a portion of the media streaming application 113, denoted herein as media streaming application 113b, that involves maintaining the client content item lists 126 (FIG. 1) in the data store 119 (FIG. 1) according to an embodiment of the present disclosure. Alternatively, the flowchart of FIG. 4 may be viewed as depicting steps of an example of a method implemented in the server 103 (FIG. 1) to determine whether a media content item 123 (FIG. 1) is to be streamed to a client 106 (FIG. 1) for rendering.

Beginning with box 253, the media streaming application 113b examines a respective client content item list 126 to determine if a given media content item 123 to be streamed to a client 106 is locally accessible to the client 106 such that the client 106 already has license rights to render the media content item 123. Also, the media streaming application 113b notes if there are any sharing rights in the client content item list 126 associated with the media content item 123. Thereafter, in box 256, if the media content item 123 is locally accessible to the client 106, then the media streaming application 113b proceeds to box 259. Otherwise, the media streaming application 113b progresses to box 263.

In box 259, the media streaming application 113b sends a directive to the client 106 to render the media content item 123 that is locally accessible to the client 106 in lieu of streaming a media content item 123. In one embodiment, such a directive is transmitted before the latency of the transmission between the server 103 and the client 106 would cause an undue delay in the rendering of the media content item 123 relative to a previously rendered media content item 123 on the client 106 as can be appreciated. Thereafter, the media streaming application 113b proceeds to box 266.

Assuming the media streaming application 113b progresses to box 263, the media streaming application 113b then proceeds to queue up one or more media content items 123 for streaming, or to initiates the streaming of a media content item 123 to the client 106. This is because such media content item(s) 123 is/are not locally accessible to the client 106. Thereafter, the media streaming application 113b progresses to box 266.

The client stream interface logic 133 is implemented to either render the locally accessible copy of the media content item 123 or to render the streamed media content item 123 depending on whether the client 106 receives a streamed media content item 123 or a directive to render a locally accessible copy of a media content item 123.

In box 266, the media streaming application 113b logs whether the media content item 123 was streamed to the client 106, or was rendered from a locally available copy of the media content items 123 as such media content items 123 were locally accessible to the client 106. Thereafter, the media streaming application 113b ends as shown.

Figure 5:
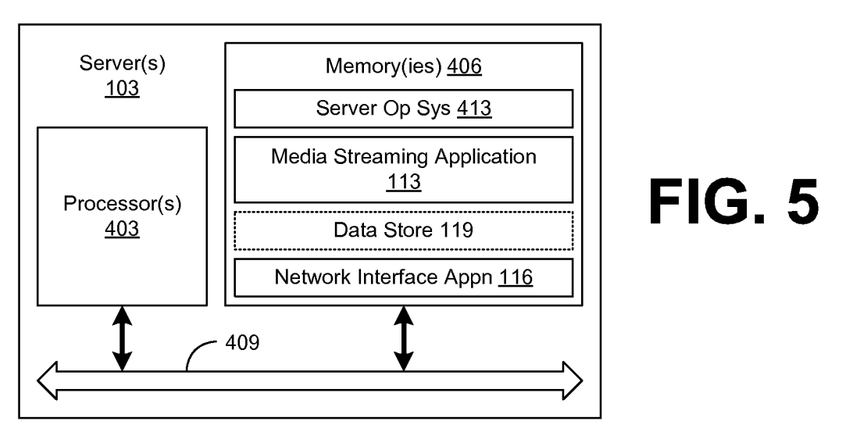
FIG. 5 is a schematic drawing that depicts one example of a server implemented in the media content transmission network of FIG. 1 according to an embodiment of the present disclosure.

Referring next to FIG. 5, shown is a schematic block diagram of the server 103 according to an embodiment of the present disclosure. The server 103 includes a processor circuit, for example, having a processor 403 and a memory 406, both of which are coupled to a local interface 409. To this end, the server 103 may comprise, for example, a server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are a server operating system 413, the media streaming application 113, the network interface application 116, and potentially other applications. Also, stored in the memory 406 is the data store 119 in which the media content items 123 (FIG. 1), the client content item lists 126 (FIG. 1), logs, and other data may be stored so as to be accessible to the server 103.

Figure 6:
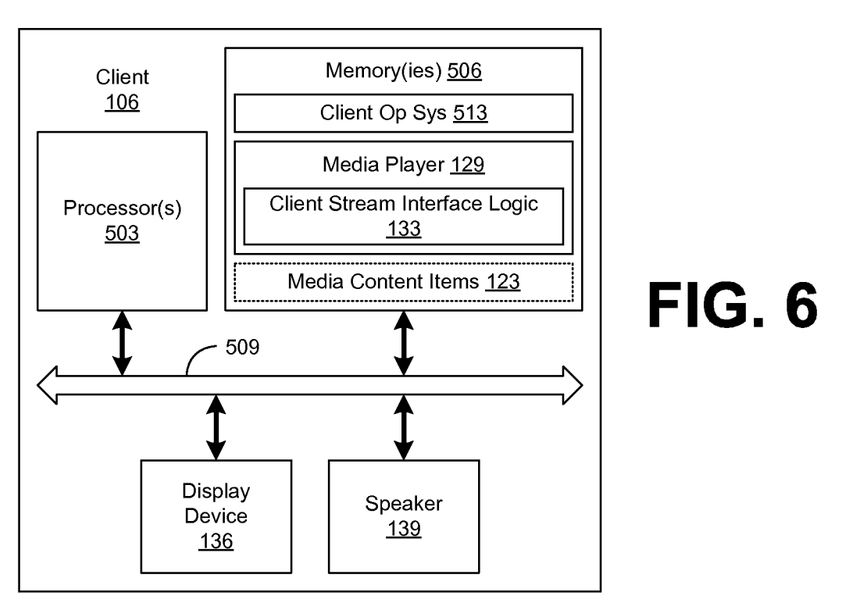
FIG. 6 is a schematic drawing that depicts one example of a server implemented in the media content transmission network of FIG. 1 according to an embodiment of the present disclosure.

Referring next to FIG. 6, shown is one example of a client 106 according to an embodiment of the present disclosure. The client 106 includes a processor circuit that comprises, for example, a processor 503 and a memory 506, both of which are coupled to a local interface 509. To this end, the local interface 509 may comprise, for example, a data bus with an accompanying address/control bus as can be appreciated. In addition, coupled to the local interface 509 are the display device 136 and the speaker 139. To this end, these components may be coupled to the local interface 509 through various video cards, audio cards, and/or like devices.

Stored on the memory 506 and executable by the processor 503 are a client operating system 513, the media player 129, and potentially other applications. The media player 129 includes, for example, the client stream interface logic 133. Also, various media content items 123 may be stored in the memory 506 or other location accessible to the client 106.

With reference to both FIGS. 5 and 6, it is understood that there may be other applications that are stored in the memories 406/506 and are executable by the processors 403/503 as can be appreciated. Also, other data may be stored in the memories 406/506 and accessed by the processors 403/503. Where any component discussed herein is implemented in the form of software, any one of a number of programming languages may be employed such as, for example, C, C++, Java, Java Script, Perl, Python, Flash, or other programming languages.

A number of software components are stored in each of the memories 406, 506 and are executable by the processors 403, 503. In this respect, the term "executable" means a program file that is in a form that can ultimately be run by the processors 403, 503. Examples of executable programs may be, for example, a compiled program that can be translated into machine code in a format that can be loaded into a random access portion of the memories 406, 506 and run by the processors 403, 503, source code that may be expressed in proper format such as object code that is capable of being loaded into a random access portion of the memories 406, 506 and executed by the processors 403, 503, or source code that may be interpreted by another executable program to generate instructions in a random access portion of the memories 406, 506 to be executed by the processors 403, 503, etc. An executable program may be stored in any portion or component of the memories 406, 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Each of the memories 406, 506 is defined herein as both volatile and nonvolatile memory and data storage components. Volatile components are those that do not retain data values upon loss of power. Nonvolatile components are those that retain data upon a loss of power. Thus, each of the memories 406, 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 403 and 503 may represent multiple processors and each of the memories 406 and 506 may represent multiple memories that operate in parallel processing circuits, respectively. In such a case, each of the local interfaces 409 and 509 may be an appropriate network that facilitates communication between any two of the multiple processors, between any processor and any of the memories, or between any two of the memories, etc. The local interfaces 409 and 509 may comprise additional systems designed to coordinate this communication, including, for example, performing load balancing. The processors 403 and 503 may be of electrical or of some other available construction.

The operating systems 413 and 513 are executed to control the allocation and usage of hardware resources such as memory space, processing time, and peripheral devices in the server 103 and client 106, respectively. In this manner, the operating systems 413 and 513 serve as the foundation on which applications depend as is generally known by those with ordinary skill in the art.

Although the media streaming application 113 (FIG. 1), the media players 129 (FIG. 1), and the client stream interface logic 133 (FIG. 1) and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-4 show the functionality and operation of an implementation of a portion of the media streaming application 113 and of the client stream interface logic 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the media streaming application 113 and the client stream interface logic 133 that comprises software or code can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a data store; and
   a first computing device in communication with the data store, the first computing device being configured to at least:
   stream, by the first computing device, a plurality of media content items to a plurality of second computing devices;
   determine, by the first computing device, that a copy of a particular media content item of the plurality of media content items is locally accessible to a particular second computing device of the plurality of second computing devices for rendering on the particular second computing device;
   determine, by the first computing device, that the particular second computing device has a license to share the particular media content item for streaming to a predefined number of other computing devices in response to determining that the copy of the particular media content item is locally accessible to the particular second computing device;
   obtain, by the first computing device, the license to share the particular media content item from the particular second computing device; and
   apply, by the first computing device, the license to stream the particular media content item to at least another one of the plurality of second computing devices.

2. The system of claim 1, wherein the first computing device is further configured to at least send a directive to the particular second computing device to render the copy of the particular media content item in response to determining that the copy of the particular media content item is locally accessible to the particular second computing device.

3. The system of claim 2, wherein the directive is sent at a time depending at least in part on a transmission latency between the first computing device and the particular second computing device.

4. The system of claim 2, wherein the first computing device is further configured to at least record the directive in a log in the data store.

5. The system of claim 1, wherein the first computing device is further configured to at least reduce a royalty fee payable by an entity associated with the first computing device for streaming the particular media content item to another one of the plurality of second computing devices based at least in part on applying the license to share the media content item.

6. The system of claim 1, wherein the first computing device is further configured to at least maintain a listing of the copy of the particular media content item that is locally accessible to the particular second computing device for rendering on the particular second computing device.

7. The system of claim 6, wherein determining that the copy of the particular media content item is locally accessible to the particular second computing device for rendering on the particular second computing device further comprises consulting the listing.

8. The system of claim 1, wherein determining that the copy of the particular media content item is locally accessible to the particular second computing device for rendering on the particular second computing device further comprises sending a request to the particular second computing device to determine that the copy of the particular media content item is locally accessible to the particular second computing device for rendering on the particular second computing device.

9. A non-transitory computer-readable medium embodying a program executable in a first computing device, wherein, when executed, the program causes the first computing device to at least:
   stream, via the first computing device, a plurality of media content items to a plurality of second computing devices;
   determine, via the first computing device, that a copy of a particular media content item of the plurality of media content items is locally accessible to a particular second computing device of the plurality of second computing devices for rendering on the particular second computing device;
   send, via the first computing device, a directive to the particular second computing device to render the copy of the particular media content item in response to determining that the copy of the particular media content item is locally accessible to the particular second computing device;

obtain, via the first computing device, from the particular second computing device a license to share the particular media content item for streaming to a predefined number of the plurality of second computing devices when the copy of the particular media content item is locally accessible to the particular second computing device and the particular second computing device has the license; and apply, via the first computing device, the license to stream the particular media content item to at least another one of the plurality of second computing devices based at least in part on the predefined number.

10. The non-transitory computer-readable medium of claim 9, wherein the directive is sent at a time depending at least in part on a transmission latency between the first computing device and the particular second computing device.

11. The non-transitory computer-readable medium of claim 9, wherein, when executed, the program further causes the first computing device to at least record the directive in a log in a data store.

12. The non-transitory computer-readable medium of claim 9, wherein a royalty fee payable for streaming the media content item to another second computing device is reduced based at least in part on using the license to share the particular media content item.

13. The non-transitory computer-readable medium of claim 9, wherein, when executed, the program further causes the first computing device to at least maintain a listing of the copy of the particular media content item that is locally accessible to the particular second computing device for rendering on the particular second computing device.

14. The non-transitory computer-readable medium of claim 13, wherein determining that the copy of the particular media content item is locally accessible to the particular second computing device for rendering on the particular second computing device further comprises consulting the listing.

15. The non-transitory computer-readable medium of claim 9, wherein determining that the copy of the particular media content item is locally accessible to the particular second computing device for rendering on the particular second computing device further comprises sending a request to the particular second computing device to determine that the copy of the particular media content item is locally accessible to the particular second computing device for rendering on the particular second computing device.

16. A method, comprising:

streaming, via a first computing device, a plurality of media content items to a plurality of second computing devices;

determining, via the first computing device, that a copy of a particular media content item of the plurality of media content items is locally accessible to a particular second computing device of the plurality of second computing devices for rendering on the particular second computing device;

determining, via the first computing device, that the particular second computing device has a license to share the particular media content item for streaming to a predefined number of other computing devices in response to determining that the copy of the particular media content item is locally accessible to the particular second computing device;

obtaining, via the first computing device, the license to share the particular media content item from the particular second computing device; and applying, via the first computing device, the license to stream the particular media content item to at least another one of the plurality of second computing devices.

17. The method of claim 16, wherein applying the license to stream the particular media content item reduces a royalty fee payable by an entity associated with the first computing device.

18. The method of claim 16, further comprising sending, via the first computing device, a directive to the particular second computing device to render the copy of the particular media content item in response to determining that the copy of the particular media content item is locally accessible to the particular second computing device.

19. The method of claim 18, wherein the directive is sent at a time depending at least in part on a transmission latency between the first computing device and the particular second computing device.

20. The method of claim 16, further comprising maintaining, via the first computing device, a listing of the copy of the particular media content item that is locally accessible to the particular second computing device for rendering on the particular second computing device.

* * * * *